(No Model.)  2 Sheets—Sheet 1.
C. E. BUELL.
ELECTRIC LIGHTING OF RAILWAY TRAINS.
No. 353,248.   Patented Nov. 23, 1886.
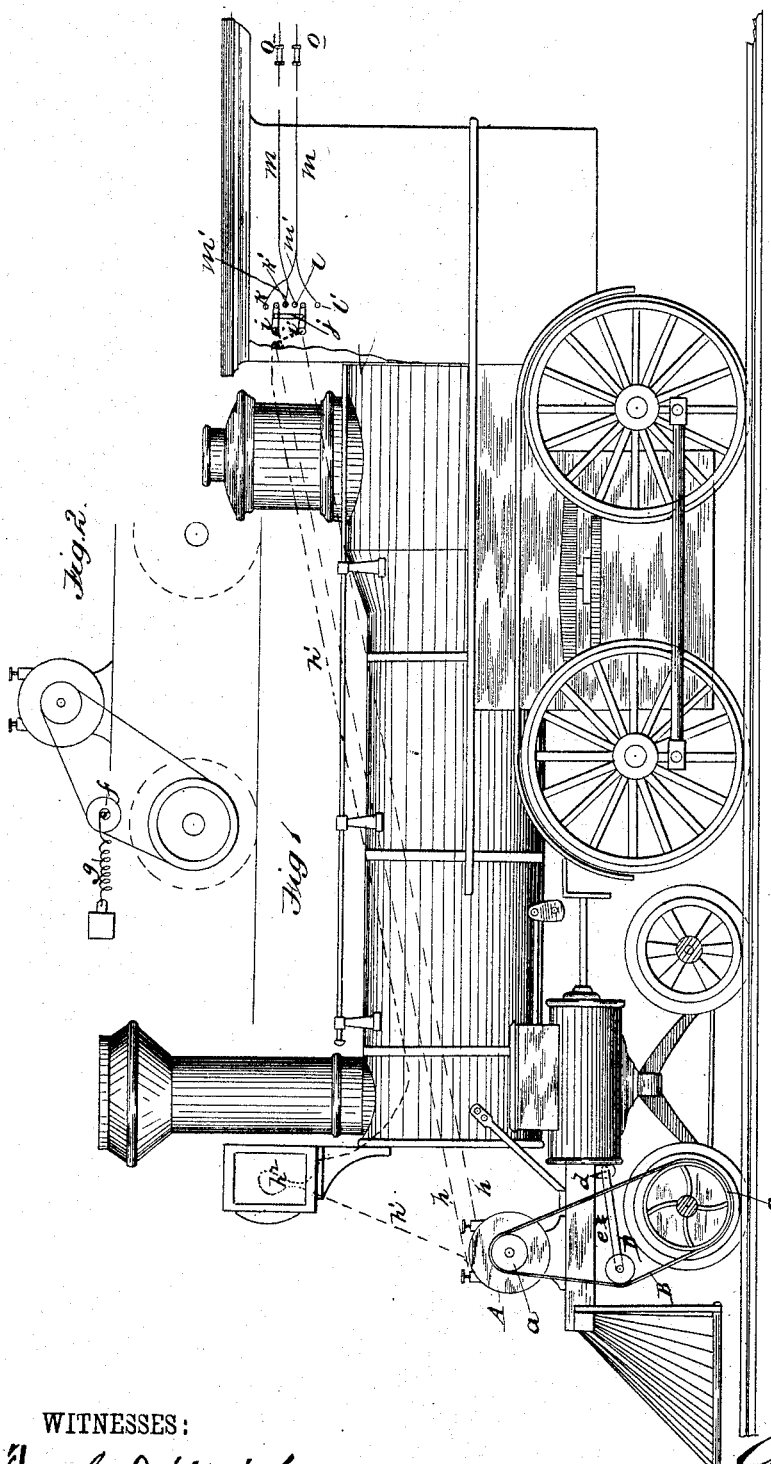
WITNESSES:
Fred. G. Dieterich.
W. E. Bowen.
INVENTOR.
Charles E. Buell
by Melville Church
His ATTORNEY.

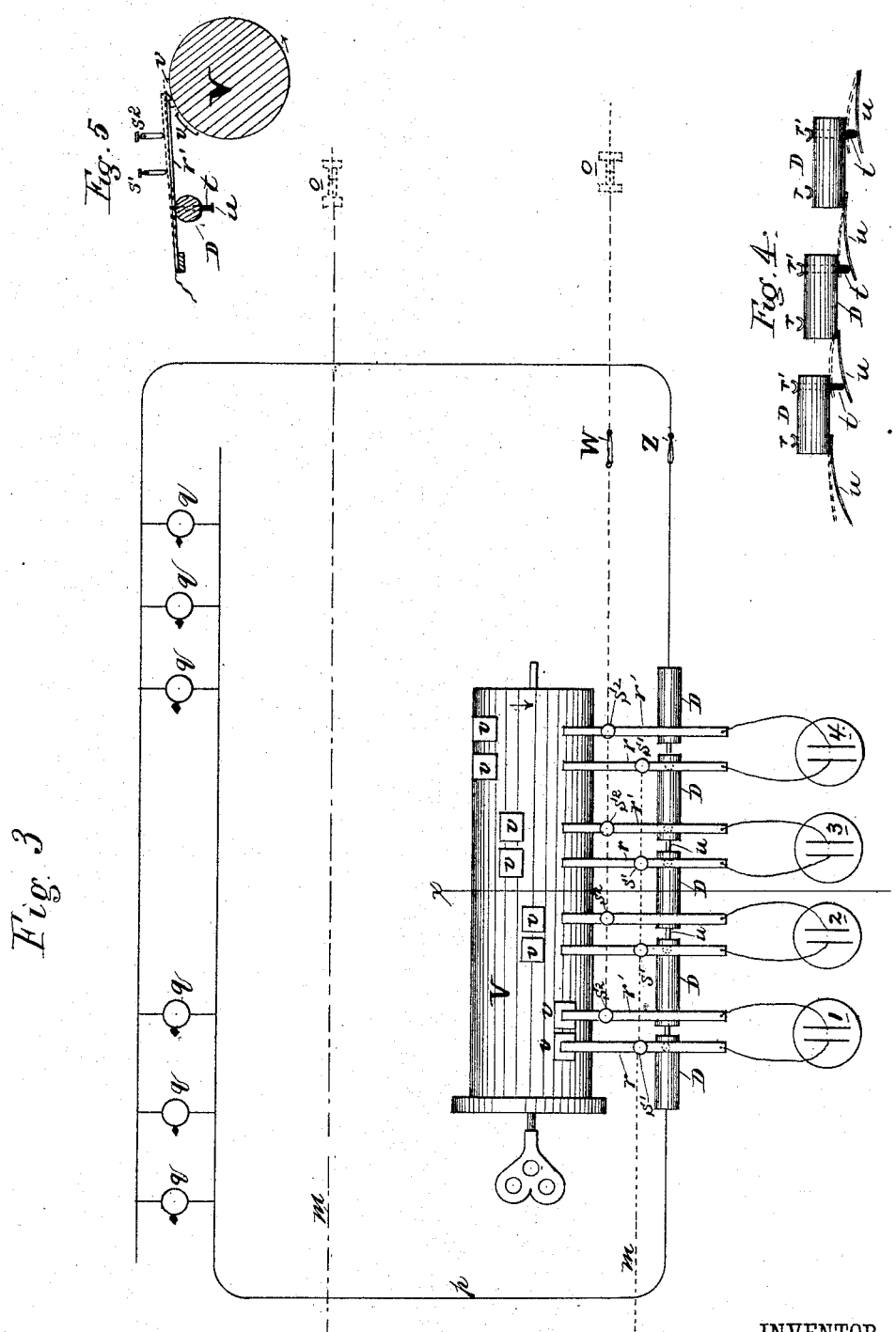

UNITED STATES PATENT OFFICE.

CHARLES E. BUELL, OF NEW HAVEN, CONNECTICUT.

ELECTRIC LIGHTING OF RAILWAY-TRAINS.

SPECIFICATION forming part of Letters Patent No. 353,248, dated November 23, 1886.

Application filed August 4, 1882. Serial No. 68,479. (No model.)

*To all whom it may concern:*

Be it known that I, CHARLES E. BUELL, of New Haven, in the county of New Haven and State of Connecticut, have invented certain new and useful Improvements in the Electric Lighting of Railway-Trains; and I do hereby declare the following to be a full, clear, and exact description of the same, reference being had to the accompanying drawings, forming part of this specification, and to the figures and letters of reference marked thereon.

My invention relates to certain novel improvements in the electric lighting of railway-trains, which I will first describe, and then point out particularly in the claims at the end of this specification.

In the accompanying drawings, Figure 1 represents a locomotive-engine carrying a dynamo-electric machine propelled from a pulley on one of the wheels of the forward truck, in accordance with my invention. Fig. 2 represents a modification of the arrangement shown in Fig. 1. Fig. 3 is a diagram illustrating the lighting equipment of each car. Fig. 4 is a detailed view of part of the switching mechanism; and Fig. 5 is a sectional view taken on line $x\,x$, Fig. 3.

A represents a dynamo-electric machine, mounted in this instance upon the front platform of the locomotive, and driven by means of a belt, B, passing around a pulley, $a$, upon its armature-shaft, and around another pulley, $c$, rigidly secured to one of the wheels on the front axle of the forward truck, as shown.

D represents a belt-tightener, consisting of an arm hinged to the platform at $d$, and carrying at its outer free end a pulley, which is pressed against the belt B by the gravity of the arm, the latter being limited in its movement by a spring, $e$, or other contrivance.

Any other form of belt-tightener may be employed in place of the one shown—as, for instance, the one represented in the modification, Fig. 2, consisting of a pulley, $f$, pressed against the belt by a retractile spring, $g$.

The employment of a belt-tightener is found to be of prime importance where a dynamo supported on the body of a locomotive or car is belted directly to either the wheel or the axle of a truck, for the reason that the oscillation of the body on its trucks and the play of the axles in their bearings produce such variations in the stress of the belt as to cause an irregular and uneven movement of the dynamo, and oftentimes a breakage of the belt, or of the chain if the latter be used instead of a belt. The belt-tightener, being automatic and self-adjusting in its operation, takes up all slack in the belt and causes the machine to at all times run smoothly.

By mounting the dynamo upon a yielding base or directly upon one of the trucks of the train, so as to partake of the rocking motion of the truck, and gearing it to the wheel or axle of the truck, the use of a belt-tightener might be dispensed with; but even in such cases, especially in the latter case, the play of the axle in its bearings would cause more or less variation in the stress of the belt.

Extending from the dynamo to the cab of the locomotive are the two circuit-conductors $h\,h$, terminating in switches $i\,i'$, which are connected by an insulating-strip, $j$, so that they will move together. These switches are adapted to make contact with pairs of contacts $k\,k'$ and $l\,l'$ at the terminations of the continuations $m\,m$ of the charging-circuit and branches $m'\,m'$ thereof, and by properly manipulating said switches currents of the same direction are caused to flow into the continuations of the charging-circuit irrespective of the direction of movement of the locomotive, as will be readily understood.

$h'\,h'$ represent a branch circuit, including an electric head-light, $h^2$.

The charging-circuit conductors between the locomotive and the several cars are provided with suitable electric couplings, as shown at $o\,o$.

In Fig. 3 I show in diagram the electric-lighting equipment of each car. $m\,m$ represent the conductors of the charging-circuit, extending through, over, or under the car, and having the electrical couplings $o\,o$ for connection with the corresponding conductors of adjoining cars. 1 2 3 4 are a series of secondary or electric storage-batteries, in which the current passing over the charging-circuit is adapted to be stored, and $p$ is the working-circuit, including electric lamps $q$ in multiple arc, into which the secondary batteries are adapted to discharge, so as to maintain the lamps. r r' are several pairs of spring contact-fingers, to the inner fixed ends of each pair of which the terminal wires of one of the secondary batteries 1 2 3 4 are connected, as shown. The fingers r of all the pairs are adapted, when raised, to strike set-screws S', electrically connected to one part of the charging-circuit, while the fingers r' are adapted, when raised, to strike other set-screws, S², electrically connected to the other part of the charging-circuit, as shown. Interposed in the discharging or working circuit p are a number of metal blocks, D D D D D, each of which has near one end a perforation through it, within which works a pin, t, of insulating material, while at its other end it has electrically connected to it a light metal spring, u. The fingers r r' are arranged immediately over the pins in the blocks D and normally press the latter down and bear directly upon said blocks, so as to make electrical connection therewith, as shown in Fig. 4, while the light springs u bear against the lower projected extremities of the pins t, also as shown in said Fig. 4, and keep said springs out of contact with the cylinders, which they overlap. V is a metallic cylinder adapted to be rotated by hand or by suitable automatic mechanism, and having a series of pairs of raised metal projections, v v, arranged progressively around its periphery and corresponding in position to the several pairs of spring-fingers r r'.

When, upon the rotation of the cylinder V, any one pair of fingers r r' are raised by contact with their appropriate projections v v, said pair of fingers are pressed against the set-screws S' S² above them, thus withdrawing the battery connected to said fingers from the discharging or working circuit and interposing it in the charging-circuit, and at the same time permitting the light metal spring u underneath the pair of fingers to lift the insulated pin and make contact with the adjoining metal block D and complete the discharging or working circuit with all the other batteries of the series interposed therein coupled for tension. As the cylinder is further rotated the same operation is repeated with the next pair of fingers, and another battery is withdrawn from the working-circuit and interposed into the charging-circuit to be charged, and the previously-charged battery is included with all the other batteries in the working-circuit in tension series. It will be observed, therefore, that the batteries of the series are separately excluded entirely from the working-circuit and charged while so excluded, and all the other batteries, coupled for intensity, are discharged into the discharging or working circuit, the latter remaining at all times unbroken.

Switches W and Z are interposed in the main charging and in the working or lamp circuits, respectively, to enable these circuits to be opened and closed at pleasure.

Having thus described my invention, I claim as new—

1. In a system of electric lighting for railways, the combination of the following elements in the equipment of each car, viz: electric conductors extending through the car and forming part of the main charging-circuit, a series of electric storage-batteries, a working-circuit including electric lamps, and switch devices for withdrawing in turn each battery of the series entirely from the working-circuit and interposing it in the charging-circuit, and simultaneously therewith closing the working-circuit with the other batteries of the series interposed therein coupled for intensity, substantially as described.

2. In a system of electric lighting, the combination, with a series of secondary or electric storage-batteries, a charging-circuit and means for charging it, and a discharging or working circuit, of fingers connected to the electrodes of each of the several batteries and normally in connection with the discharging or working circuit, contacts in the charging-circuit which the fingers strike when lifted, and means, substantially as described, for lifting said fingers successively in pairs and closing the discharging-circuit, whereby each battery of the series is in turn entirely withdrawn from the working-circuit and interposed in the charging-circuit to be charged, while the working-circuit is simultaneously closed with all the other batteries of the series coupled therein for intensity, substantially as described.

3. In combination with the charging-circuit, a series of secondary batteries, the electrodes of each battery being connected to contact-fingers, means for connecting said fingers to the charging-circuit, and switch devices operated by said fingers, whereby when they are connected with the charging-circuit the working-circuit including the remaining batteries will be completed around said battery, substantially as described.

4. In combination with the charging-circuit, a series of secondary batteries, the electrodes of each battery being connected to fingers, the contacts of the working-circuit placed in proximity to said fingers, the conducting-blocks with which one of the fingers of each succeeding battery is normally connected, switching devices connecting the conducting-blocks operated by the fingers, and means for operating upon the fingers to place them in contact with the charging-circuit contacts, whereby when the fingers of a battery are moved into connection with the contacts the battery will be placed in the working-circuit and at the same time the charging-circuit will be closed through the remaining batteries, substantially as described.

5. In combination with a charging-circuit, a working-circuit, and a series of secondary batteries normally connected to the working-circuit in series, contacts connected with the terminals of each battery, devices for successively shifting the contacts from the working-circuit to the charging-circuit, whereby the batteries may be successively cut out of the working-circuit and connected into the charging-circuit, and independent switches for opening the charging-circuit and the working-circuit, or either of them, substantially as described.

6. In combination with a charging-circuit, a working-circuit, and a series of secondary batteries normally connected to the working-circuit in series, contacts connected with the terminals of each battery, continuously-operating switch devices for shifting the contacts from the working-circuit to the charging-circuit, whereby the batteries may be successively cut out of the working-circuit and connected into the charging-circuit and at the same time the working-circuit closed with the remaining batteries coupled therein, substantially as described.

7. In combination with the charging-circuit, a series of secondary batteries, a working-circuit, the series of pairs of fingers connected to the electrodes of the batteries, the metal blocks connected to the working-circuit, having the springs secured to one end, the insulating-pins passing through the blocks, the contacts for the charging-circuit arranged in proximity to the pairs of fingers, and the rotary drum having the projections adapted to act upon the pairs of fingers to raise them into contact with the charging-circuit contacts, thus inserting the battery in the charging-circuit and at the same time closing the working-circuit through the remaining batteries, substantially as described.

CHARLES E. BUELL.

Witnesses:
MELVILLE CHURCH,
FRED F. CHURCH.